(12) United States Patent
Benedetti et al.

(10) Patent No.: US 8,793,845 B2
(45) Date of Patent: Aug. 5, 2014

(54) FASTENER AND FASTENER ASSEMBLY

(75) Inventors: Steven M. Benedetti, Sterling Heights, MI (US); Matthew L. Kosiara, Emmett, MI (US)

(73) Assignee: Newfrey LLC, Newark, DE (US)

( * ) Notice: Subject to any disclaimer, the term of this patent is extended or adjusted under 35 U.S.C. 154(b) by 603 days.

(21) Appl. No.: 12/574,960

(22) Filed: Oct. 7, 2009

(65) Prior Publication Data

US 2010/0088860 A1    Apr. 15, 2010

Related U.S. Application Data

(60) Provisional application No. 61/104,407, filed on Oct. 10, 2008.

(51) Int. Cl.
*F16B 5/12* (2006.01)
*F16B 21/00* (2006.01)
*F16B 21/07* (2006.01)
*F16B 21/08* (2006.01)

(52) U.S. Cl.
CPC .............. *F16B 21/075* (2013.01); *F16B 21/088* (2013.01)
USPC ............................ 24/292; 24/297; 24/581.11

(58) Field of Classification Search
CPC ....... F16B 21/075; F16B 21/088; F16B 5/065
USPC ............. 24/292, 297, 581.11; 296/1.08, 214; 411/508–510
See application file for complete search history.

(56) References Cited

U.S. PATENT DOCUMENTS

| 1,676,014 | A | | 7/1928 | Fecher |
| 2,216,047 | A | | 9/1940 | Place |
| 2,295,444 | A | | 9/1942 | Woodward |
| 2,574,330 | A | | 11/1951 | Judd |
| 2,984,877 | A | | 5/1961 | Perrochat |
| 3,004,643 | A | | 10/1961 | MacCallum |
| 3,197,935 | A | | 8/1965 | Clancy et al. |
| 3,294,436 | A | * | 12/1966 | Bull et al. ................... 296/1.08 |

(Continued)

FOREIGN PATENT DOCUMENTS

| JP | 08-068406 | 3/1996 |
| JP | 2002 079889 | 3/2002 |

(Continued)

OTHER PUBLICATIONS

Emhart Engineering Drawing #17234, Dated Nov. 12, 2003—Retainer-Sill Plate.

(Continued)

*Primary Examiner* — Robert J Sandy
*Assistant Examiner* — Matthew Sullivan
(74) *Attorney, Agent, or Firm* — Michael P. Leary

(57) ABSTRACT

A fastener including a base and a support part extending from the base. The support part includes two legs and an end portion; the two legs extend from the base and are connected to one another by the end portion. A retention finger is located between the legs of the support, a first end of the retention finger being attached to the base and a second end of the retention finger being attached to the end portion of the support. The retention finger extends outwardly to a peak and tapers inwardly from the peak towards the first and second ends.

11 Claims, 14 Drawing Sheets

(56) References Cited

U.S. PATENT DOCUMENTS

| | | | |
|---|---|---|---|
| 3,977,048 | A | 8/1976 | Benedetti |
| 4,527,821 | A | 7/1985 | Tanaka |
| 4,644,612 | A | 2/1987 | Osterland |
| 4,712,341 | A | 12/1987 | Harris, Jr. |
| 5,662,375 | A | 9/1997 | Adams et al. |
| 5,671,513 | A | 9/1997 | Kawahara et al. |
| 5,966,782 | A | 10/1999 | Ishihara et al. |
| 6,074,150 | A | 6/2000 | Shinozaki et al. |
| 6,119,316 | A | 9/2000 | Ishihara et al. |
| 6,264,393 | B1 | 7/2001 | Kraus |
| 6,317,937 | B1 | 11/2001 | Ishihara et al. |
| 6,449,814 | B1 | 9/2002 | Dinsmore et al. |
| 6,454,507 | B1 * | 9/2002 | Romero Magarino ........ 411/508 |
| 6,481,682 | B2 | 11/2002 | Miura |
| 6,665,914 | B2 | 12/2003 | Ogawa |
| 6,796,006 | B2 | 9/2004 | Hansen |
| 7,300,089 | B2 * | 11/2007 | Kuroda ........................ 296/39.1 |
| 7,401,388 | B2 * | 7/2008 | Hansen ........................... 24/297 |
| 7,444,721 | B2 | 11/2008 | Smith et al. |
| 7,461,436 | B2 * | 12/2008 | Asano ............................. 24/297 |
| 7,536,755 | B2 * | 5/2009 | Nakajima et al. ............... 24/297 |
| 7,552,516 | B2 * | 6/2009 | Okada et al. .................... 24/297 |
| 8,056,193 | B2 * | 11/2011 | Park ................................ 24/297 |
| 2002/0005464 | A1 | 1/2002 | Miura |
| 2005/0116485 | A1 * | 6/2005 | Kuroda ........................ 296/1.08 |
| 2006/0085955 | A1 * | 4/2006 | Asano ............................. 24/297 |
| 2007/0033774 | A1 * | 2/2007 | Okada et al. .................... 24/289 |
| 2007/0050955 | A1 * | 3/2007 | Hansen ........................... 24/297 |
| 2007/0186389 | A1 | 8/2007 | Smith et al. |
| 2008/0172845 | A1 * | 7/2008 | Nakajima et al. ............... 24/297 |

FOREIGN PATENT DOCUMENTS

| | | |
|---|---|---|
| JP | 2002 155916 | 5/2002 |
| JP | 2003139112 A | 5/2003 |
| JP | 2008164085 A | 7/2008 |

OTHER PUBLICATIONS

Emhart Engineering Drawing #17215, Dated Jan. 28, 2003—Retainer-Sill Plate.
Termax Corporation Drawing #58001, Dated Jun. 21, 2007—Pillar Clip Arrowhead.
ITW Engineered Fasteners Brochure from web page.
European Search Report dated Dec. 28, 2011.

* cited by examiner

FASTENER AND FASTENER ASSEMBLY

CROSS-REFERENCE TO RELATED APPLICATIONS

This application claims priority from and incorporates by reference in its entirety U.S. Provisional Application No. 61/104,407 filed Oct. 10, 2008.

BACKGROUND OF THE INVENTION

1. Field of the Invention

The present invention relates to a fastener and fastener assembly which may be used to secure two parts together.

2. Description of the Related Art

There are various related art fasteners for attaching two parts together. One such related art fastener assembly is described in U.S. Pat. No. 6,796,006, which describes the clip 210 shown in FIGS. 18 and 19. As shown in FIGS. 18 and 19, the clip 210 includes a bottom end 214, a top end 216 and legs 212 extending therebetween. The clip 210 further includes retaining heads 218 at the top end 216 and a pair of retaining tabs 224 with tips 228. The clip 110 secures a first panel 230 to a second panel 240 as shown in FIG. 19. As shown in FIG. 19, the second panel 240 has a blade fastener 242 with an aperture 248. The first panel 230 fits over the legs 212 of the clip 210 to engage the clip 210 and the first panel 230. Additionally, the retaining tabs 224 fit in the aperture 248 of the blade fastener 242 extending from the second panel 230 to secure the clip 210 to the second panel 240. Accordingly, the clip 210 can be secured to both the first and second panels 230, 240, thus securing the first and second panels 230, 240 together. As shown in FIGS. 18 and 19, both retaining tabs 224 fit into the same single aperture 248. Also, the clip 210 is open at its sides.

There are several drawbacks to this related art. For example, the clip 210 may inadvertently be removed from the blade fastener 242 when the first panel 230 is being removed from the clip 210. Additionally, a side load may cause the clip 210 and the first panel 230 to become disengaged from the blade fastener 242 and second panel 240.

Accordingly, it is desired to provide a more reliable and secure fastener assembly.

SUMMARY OF THE INVENTION

This application is directed to a fastener and fastener assembly configured to provide a more secure connection between parts.

According to one aspect of the invention there is a fastener including a base and a support part extending from the base. The support part includes two legs and an end portion; the two legs extend from the base and are connected to one another by the end portion. A retention finger is located between the legs of the support, a first end of the retention finger being attached to the base and a second end of the retention finger being attached to the end portion of the support. The retention finger extends outwardly to a peak and tapers inwardly from the peak towards the first and second ends.

The retention finger may be opposed to the legs of the support with respect to a centerline running along a length of the base.

The retention finger may include a protrusion which protrudes towards a centerline running along a length of the base.

The protrusion may become narrower in a direction away from the base.

The fastener may comprise only a single retention finger and the retention finger may be resilient.

The fastener may further include a pair of tension fingers extending from a side of the base opposite the inner and outer retention finger the base may include a cutout.

The support part may be made of a different material than the retention finger.

The legs may include ridge portions between the base and the end portion.

According to another aspect of the invention, there is a fastener assembly including a rib attachment and a fastener coupled to the rib attachment. The rib attachment comprises a body portion and side edges and the fastener comprises a base and a support extending from the base. The support fits over at least a portion of side edges of the rib attachment.

The support may include a pair of legs and an end portion, the pair of legs extending from the base and being connected to one another by the end portion and the legs may fit over at least a portion of the side edges the rib attachment.

The rib attachment may further include a pair of rails at the side edges, the rib attachment may include a front side and a back side opposite the front side and the rails may extend from the back side. Also, the legs may fit over at least a portion of the front side.

The fastener may further include a retention finger disposed between the legs of the support and a first end of the retention finger may be attached to the base and a second end of the retention finger may be attached to the end portion of the support.

The rib attachment may further include a hole and the retention finger may further include a protrusion which engages the hole to couple the fastener to the rib attachment.

The fastener may include only a single protrusion engaged with the hole

The protrusion may narrow in a direction away from the base.

The hole may narrow in the same direction as the protrusion; and the hole may be substantially triangular shaped.

The assembly may further include a rib and the rib attachment may be attached to the rib.

The retention finger may include a peak and taper from the peak towards the first and second ends.

The assembly may further include a panel held between the peak of the retention finger and the base.

The legs may include ridges and the panel may be further held between the ridges and the base.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF EXEMPLARY EMBODIMENTS OF THE INVENTION

Figure 10:
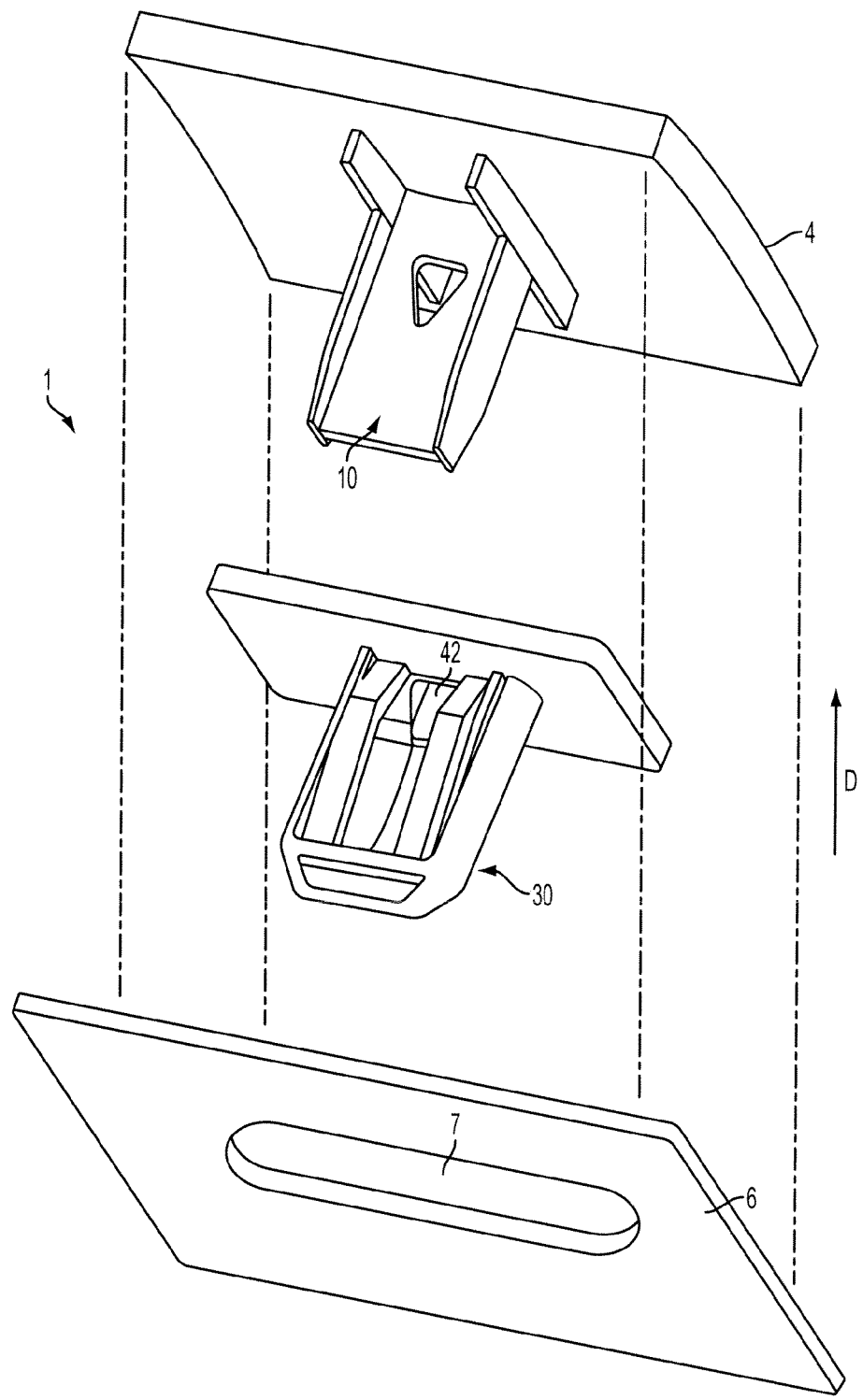
FIG. 10 is an exploded view of the fastener assembly according to an exemplary embodiment of the present invention.
Figure 11:
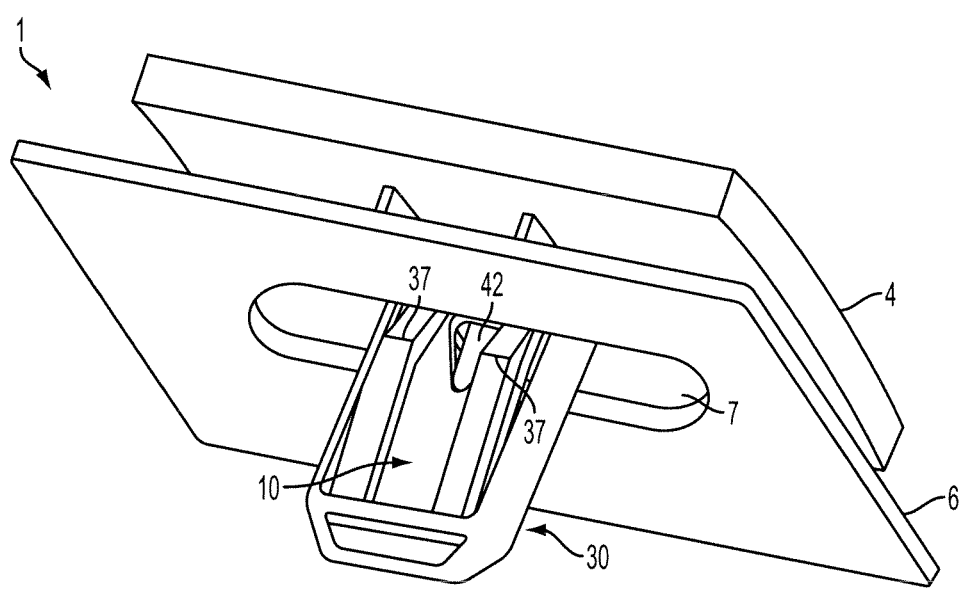
FIG. 11 is a perspective view of the fastener assembly according to an exemplary embodiment of the present invention.

A fastener assembly 1 according to an exemplary embodiment of the invention will now be described in greater detail with reference to the accompanying drawings. The fastener assembly 1 of the exemplary embodiment uses a fastener 30 to removably assemble two parts together. In the exemplary embodiment, the fastener 30 assembles a panel 6 to a rib 4 with a rib attachment 10. FIG. 11 shows the fastener assembly 1 when it has been assembled and FIG. 10 is an exploded view of the fastener assembly 1. As shown in FIGS. 10 and 11, the fastener assembly includes a rib 4, a rib attachment 10, a fastener 30 and a panel 6.

Figure 1:
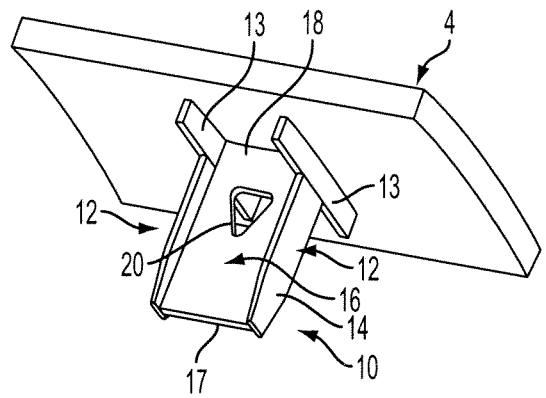
FIG. 1 is a perspective view illustrating an exemplary embodiment of a rib and rib attachment according to the present invention.

The rib attachment 10 and the rib 4 are shown in greater detail in FIG. 1. The rib 4 and the rib attachment 10 may be integrally formed together as a single piece or may be two separate pieces secured to one another.

Figure 2:
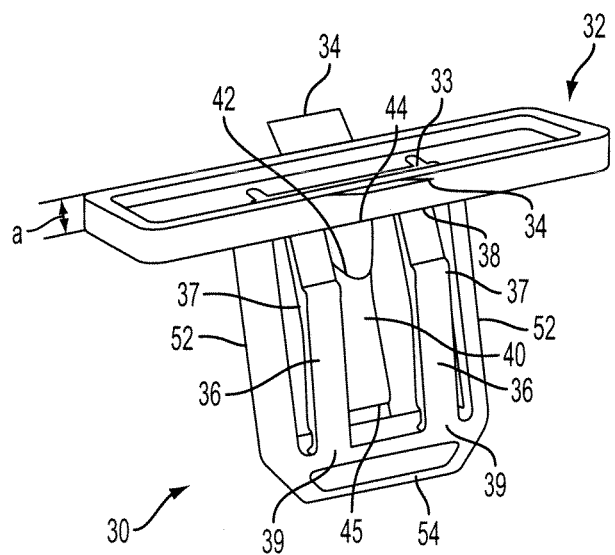
FIG. 2 is a perspective view of a fastener according an exemplary embodiment of the present invention.

The fastener 30 is shown alone and in greater detail in, for example, FIG. 2. The fastener 30 includes a resilient inner retention finger 40 and a pair of resilient outer retention fingers 36. The inner retention finger 40 includes a protrusion 42. The fastener 30 is attached to the rib attachment 10 by the engagement of a protrusion 42 on the fastener 30 with a hole 20 in the rib attachment 10. The fastener 30 is generally connected to the rib attachment 10 after the rib attachment 10 and the rib 4 are joined (if they are not integrally formed).

Referring to FIGS. 10 and 11, the panel 6 is attached to the fastener 30 by being pushed over the inner retention finger 40 and the pair of outer retention fingers 36 in the assembly direction "D" shown in FIG. 10. In a relaxed state, the inner retention finger 40 and outer retention fingers 36 extend outwardly towards peaks 43 and 37, respectively. When the panel 6 is pushed onto the retention fingers 36, 40, it initially flexes the retention fingers inwards. Then, after the panel 6 is pushed over peaks 43, 37 of the retention fingers and the panel 6 approaches its final assembly point, the retention fingers 36, 40 spring back towards their relaxed state to secure the panel 6 next to a base 32 of the fastener. Because the width of the hole 7 in the panel 6 is smaller than the width of the fastener 30 at the peaks 43, 37, the panel 36 is held between the peaks of the retention fingers 36, 40 and the base 32. In this manner, the fastener assembly 1 is assembled as shown in FIG. 11 and connects panel 6 to the rib 4. Further details of the components of the fastener assembly 1 and their structure and operation will be described below.

FIG. 1 illustrates the rib 4 and rib attachment 10 in further detail. The rib attachment 10 includes a pair of rails 12 with base portions 13 and extending portions 14. A body portion 16 is formed between the pair of rails 12 which include outer sides comprising side edges. The body portion 16 has a bottom end 17 and a top end 18. The base portions 13 of the rails 12 are attached to the rib 4 and the extending portions 14 extend away from the rib 4 and the base portions 13. The rib attachment 10 may be attached to the rib 4 by any of various structures/methods including, but not limited to, mechanical fastening, adhesion or welding. Alternatively, the rib attachment 10 and the rib 4 may be a single monolithic piece. The body portion 16 of the rib attachment 10 includes a hole 20 designed to be engaged with a protrusion 42 on the fastener 30 so as to secure the fastener 30 to the rib attachment 10. The function of the hole 20 and protrusion 42 will be described in further detail below.

FIGS. 2-7 show various views of the fastener 30. As shown in these figures, the fastener 30 includes a base 32, 32' at a top end. A support 50, a resilient inner retention finger 36 and a pair of resilient outer retention fingers 40 extend downwardly from the bottom side of the base 32, 32'. As shown in FIGS. 2 and 4-6, the fastener 30 may also include a pair of tension fingers 34 protruding from a top of the base 32, 32'. The fastener 30 may be made of a plastic, including, but not limited to an acetal, nylon or polypropylene.

Figure 3:
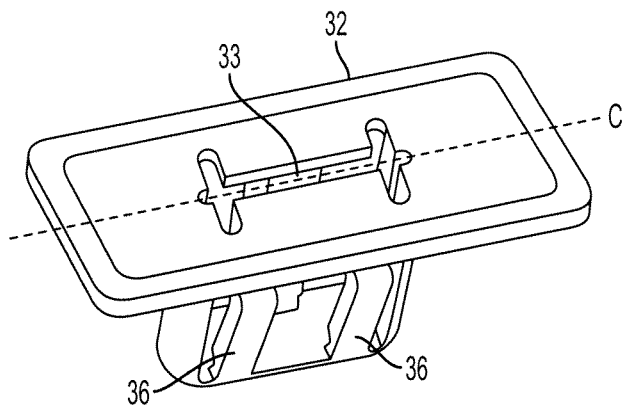
FIG. 3 is another perspective view of the fastener according to an exemplary embodiment of the present invention.
Figure 4:
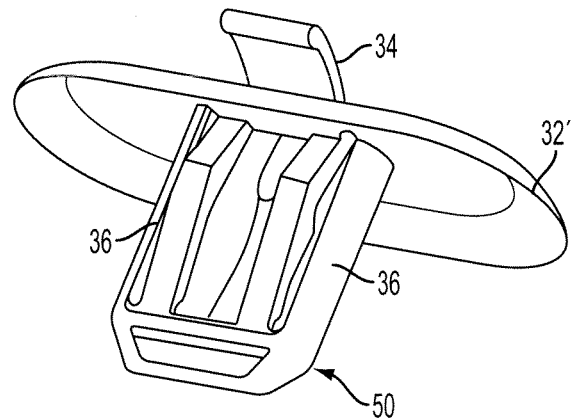
FIG. 4 is another perspective view of the fastener according to an exemplary embodiment of the present invention.

As shown in FIGS. 2-4, the base 32 can vary in shape according to the particular usage of the clip. As shown in FIG. 2, the base 32 is generally rectangular and is only slightly wider than the support 50, thereby reducing the amount of material and associated costs. In the exemplary embodiment of FIG. 2, the base may have a thickness "a" of about 2 mm. Alternatively, the base may be wider or may have a different shape, such as the elliptical concave base 32' shown in FIG. 4. The elliptical concave base 32' shown in FIG. 4 may be advantageous because the bottom of the base 32' can contact a panel being assembled on the fastener 30, creating tension between the concave surface and the panel 6. Because the bottom of the concave base 32' can contact the panel 6 with a degree of tension, it can limit the movement or rattling of the panel 6 when assembled to the fastener 30.

As best shown in FIG. 3, the base 32 includes a cutout portion 33. The cutout 33 allows for the base 32 (and the fastener 30 generally), to be slid onto the rib attachment 10. Particularly, when the cutout 33 is aligned with the bottom of the rib attachment 10, the base can be slid over the rib attachment 10 to fit thereon, as shown in, for example, FIG. 9. The cutout 33 may be made of any suitable shape which allows for the fastener 30 to be slid over and engaged with the rib attachment 10. In the exemplary embodiment, the cutout 33 is shaped to correspond to the cross sectional shape of the rib attachment 10. Because the cross-sectional shape of the cutout 33 in the exemplary embodiment corresponds to a cross-sectional shape of the rib attachment 10, the meshing of the edges of the cutout 33 with surfaces of the rib attachment 10 helps to align the parts and restrict rattling or other relative movement.

As shown in the FIGS. 2-4 and 7, the support portion 50 extends from a bottom side of the base 32 of the fastener 30.

Figure 7:
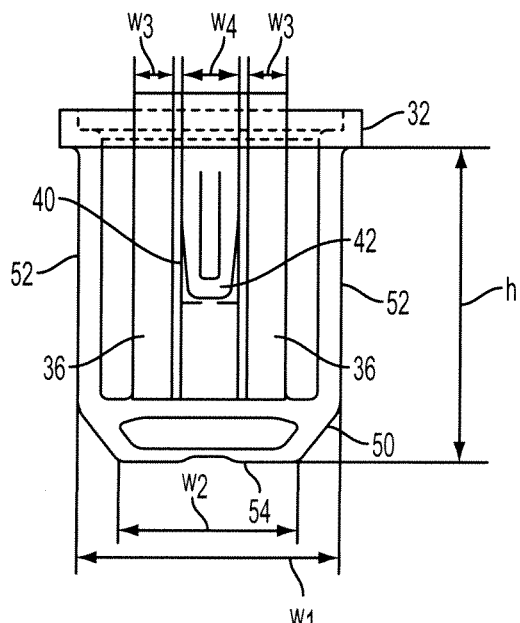
FIG. 7 is a front view of a fastener according to the exemplary embodiment of the present invention.
Figure 8:
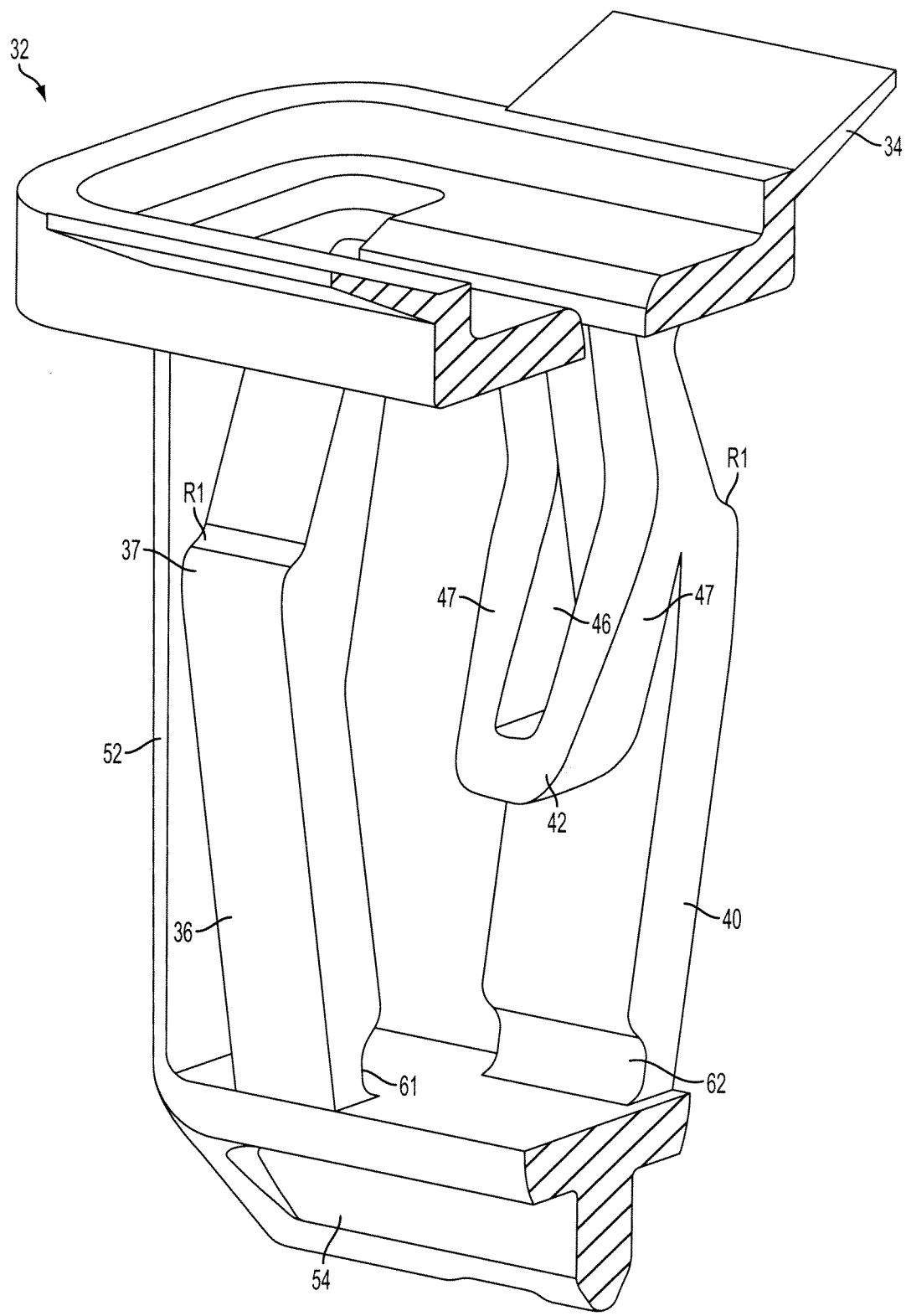
FIG. 8 is a cut-away perspective view of the fastener according to an exemplary embodiment of the present invention.

In one exemplary embodiment, the support 50 has a height "h" of about 17 mm. The support includes a pair of legs 52 which extend from the bottom side of the base 32 and a bottom end portion 54 which connects the bottoms of the legs 52. The legs 52 of the support provide supports at the sides of the fastener 30. As shown in FIG. 7, the width of the bottom end portion 54 steadily decreases from w1 where it meets the legs 52 to w2 at the bottom of the bottom end portion 54. In one exemplary embodiment, w1 is about 14 mm wide and w2 is about 10 mm. As shown in FIG. 8 the end portion 54 has a T-shaped cross-section near the center of the fastener 30.

The pair of outer retention fingers 36 and the inner retention finger 40 extends from the base 32 of the fastener 30 to the bottom end portion 54 of the support 50. The outer retention fingers have first (top) ends 38 attached to the base 32 and second (bottom) ends 39 attached to the bottom end portion 54 of the support 50. The outer retention fingers 36 protrude outwardly from their ends 38, 39 towards a peak 37. That is, the outer retention fingers 36 extend outwardly in a thickness direction "T" from the first end 38 at the base 32 until they reach a peak at 37 and then taper back inwardly to their second end 39 at the bottom end portion 54 of the support 50 (see FIG. 5). Like the outer retention fingers 36, the inner retention finger 40 has a first (top) end 44 attached to the base 32 and a second (bottom) end 45 attached to the bottom end portion 54 of the support 50. Also, the inner retention finger 40 extends outwardly from the first end 44 at the base 32 until it reaches a peak at 43 and then tapers back inwardly to its second end 39 at the bottom end portion 54 of the support 50. Accordingly, the inner retention finger 40 is closer to the outer retention fingers 36 in a thickness direction T at the base than at the peaks 37, 43 (at which point the inner retention finger 40 and outer retention fingers 36 are farthest apart). For example, in the exemplary embodiment of FIG. 5, the inner retention finger 40 may be spaced about spaced about 4 mm to 5 mm apart at T1 and about 8 mm at T2.

Figure 5:
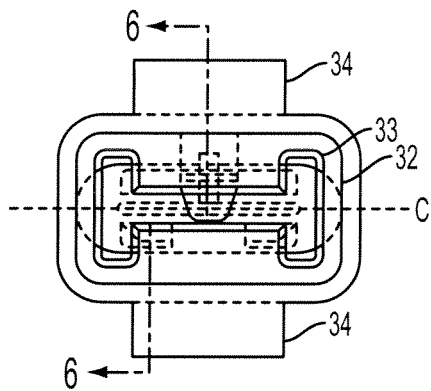
FIG. 5 is a plan view of the fastener according to an exemplary embodiment of the invention.
Figure 6:
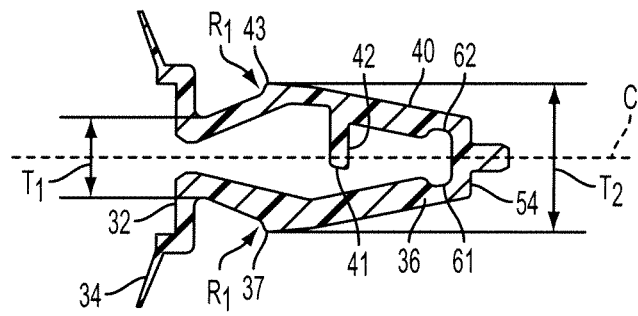
FIG. 6 is a cross-sectional side view of the fastener according to an exemplary embodiment of the present invention, taken through line —6— in FIG. 5.

FIG. 6 is a cross-sectional view of the fastener 30 taken through line —6— in FIG. 5. The cross section runs through a center of one of the outer retention fingers 36 and the center of the one inner retention finger 40. As shown in FIG. 6, the retention fingers 36, 40 have a radius of curvature R1 as they approach the peak from the base 32 side. In an exemplary embodiment, the radius of curvature may be about 0.4 to 0.6 mm. This helps to secure the panel 6 between the peaks 37, 43 and the base 32. As also shown in FIGS. 6 and 8, the retention fingers 36, 40 are narrower where they meet the bottom end portion 54 of the support 50. The narrower portions 61, 62 aid in the flexibility of the retention fingers 36, 40.

As shown in FIG. 5, the inner retention finger 40 may be wider than the outer retention fingers 36. For example, in one exemplary embodiment, the inner retention finger 40 may have a width w3 of about 3 mm and the outer retention fingers may have a width w4 of about 2 mm. Having a greater width for the inner retention finger 40 increases its strength. In the exemplary embodiment, the inner retention finger 40 is the only retention finger which engages the rib attachment 10. The additional strength provided by an increased width helps to ensure that the inner retention finger 40 can withstand the forces created by its engagement with the hole 20 in the rib attachment 10.

In the exemplary embodiments, there are two outer retention fingers 36 and one inner retention finger 40. This allows for a simple and effective configuration which provides for a secure fit through the use of multiple retention fingers in a symmetrical configuration. However, the number of retention fingers is not particularly limited and there do not have to be "inner" and "outer" retention fingers. For example, there may be simply two symmetrically formed retention finger, with neither being "inner" or "outer".

Figure 9:
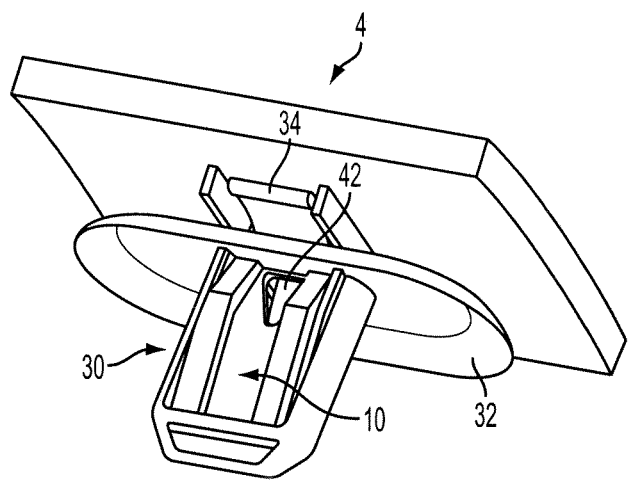
FIG. 9 is a perspective view of the rib, rib attachment and fastener in an assembled condition.

As shown in the figures, the inner retention finger 40 of the exemplary embodiments includes a protrusion 42 which is designed to correspond to the hole 20 on the attachment rib 10. The protrusion 42 is shown in various drawings, including FIGS. 2, 4, 6 and 7. As shown in the figures, the protrusion 42 extends inwardly from the inner retention finger 40. As described above, the fastener 30 may be slid onto the rib attachment 10 through the cutout 33 on the base 32. Eventually, as the fastener 30 is slid over the rib attachment 10, the protrusion 42 comes into engagement with the hole 20. The inner retention finger 40 is elastic such that when the fastener 30 is being slid over the rib attachment 10, the surface of the body portion 16 interferes with the protrusion 42, thereby pushing the protrusion 42 and the inner retention finger 40 outwards. Once the protrusion 42 reaches the hole 20 it springs into the hole 20 in order to engage the fastener 30 and rib attachment 10 as shown in FIG. 9. The interference between the protrusion 42 and the hole 20 attaches the fastener 30 to the attachment rib 10

As shown in FIG. 5, the protrusion 42 may extend past a centerline of the fastener 30. This degree of extension can enable a better engagement of the protrusion 42 and the hole 20. In one exemplary embodiment, the protrusion 42 may extend past a centerline "C" of the fastener 30 by about 0.6-0.7 mm. Additionally, a front face 41 of the protrusion 42 may be angled as shown in FIG. 5 so that a bottom end portion of the protrusion 42 protrudes farther than a top portion of the protrusion 42. The protrusion may form an angle of about 25° with the centerline "C". As shown in FIG. 8, the protrusion 42 is substantially hollow, such that it has a hollow portion 46 bounded by two side walls 47.

Figure 18:
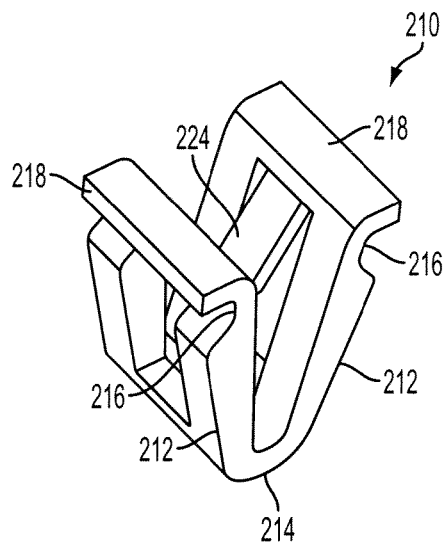
FIG. 18 is an illustration of a related art clip.
Figure 19:
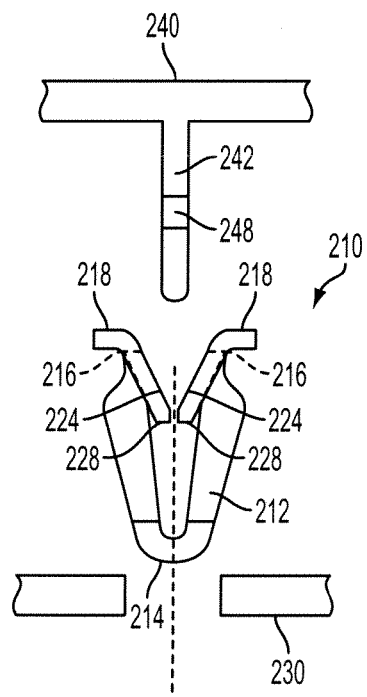
FIG. 19 is an illustration of the related art clip of FIG. 18 along with first and second panels.

In the exemplary embodiment there is a single protrusion 42 which engages a single hole 20. Because there is only one protrusion 42 engageable with the hole 20, the protrusion 42 can enter more than halfway through the hole 20. For example, the protrusion 42 can be received entirely into the hole 20 and may extend through the hole 20 with a portion extending out the other side of the hole 20. In prior art devices, such as that shown in FIGS. 18 and 19, two fingers/protrusions are both received in a single hole, each entering the hole from opposite sides. Because there are two protrusions in the single hole, neither protrusion can enter the hole more than halfway, because the protrusions contact one another at this halfway point. Because the protrusion 42 can enter more than halfway into the hole 20, there can be a more secure engagement of the protrusion 42 and the hole 40 and, therefore, the fastener 30 and the attachment rib 4.

The exemplary embodiments shown in the figures include one hole and one protrusion. However, a more secure engagement can be achieved with other embodiments which include more than one hole and protrusion. For example, in an embodiment with two protrusions and two holes (one hole corresponding to each of the two protrusions), the protrusions may similarly be able to extend fully into or through the hole as is the case with the illustrated exemplary embodiment in which there is only one hole and one protrusion. Of course, the invention is not specifically limited to instances in which the number of holes and protrusions correspond or in which each hole receives only a single protrusion.

Furthermore, as shown in FIGS. 2, 4, 5, 7 and 8, the protrusion 42 is formed on the inner retention finger 40. Thus, the inner retention finger 40 both helps to retain the panel 6 and engages the fastener 30 with the rib attachment 10. This configuration allows the protrusion 42 to more securely join the fastener 30 and the rib attachment 10 when the panel 6 is being removed from the fastener 30. When the panel 6 is being removed from the fastener assembly (direction "R" in FIGS. 10 and 11), for servicing or disassembly of the part, it produces a force on the fastener 30 away from the rib attachment 10. That is, when the panel 6 is moved in the direction R, it produces a force on the fastener 30 in the same direction. In related art fastener assemblies, this force may cause the fastener 30 to be inadvertently removed from the rib attachment 10. However, in the exemplary embodiment of the present invention, as the panel 6 is removed from the assembly, it also forces the retention finger 36, 40 inwardly. In the exemplary embodiment, because the protrusion 42 is located on the inner retention finger 40, pushing the inner retention finger 40 inwardly also pushes the protrusion 42 in a direction of engaging with the hole 20. This helps to maintain the engagement of the protrusion 42 with the hole 20 and, thus, the attachment between the fastener 30 and the rib attachment 10. Therefore, while removal of the panel 6 produces a force on the fastener 30 in the R direction of pulling apart the fastener 30 and the rib attachment 10, it also produces an inward force on the inner retention finger 40 and the protrusion 42 which helps to maintain the engagement of the protrusion 42 and the hole 20. This helps to resist the force pulling apart the fastener 30 and the rib attachment 10 and keep the fastener 30 and rib attachment 10 assembled even as the panel 6 is removed from the fastener 30.

The shape of the protrusion 42 and the hole 20 in the exemplary embodiment also aids in providing a tight fastener assembly 1. As shown in FIG. 1, for example, the hole 20 is larger towards the base 13 of the rib attachment 10 and, as shown in FIG. 2, the protrusion 42 is larger towards the base 32 of the fastener 30. Particularly, the hole 20 is generally triangular shaped. Because the hole 20 is larger at its top than its bottom, the protrusion 42 is forced towards the top and center of the hole 20 where there is more room due to the larger dimension of the hole 20 near its top. Because the protrusion 42 is urged towards the top of the hole 20 and the base 13 of the rib attachment 10, the fastener 30 is urged in a direction of assembly with the rib attachment 10 and provides a tighter and more secure assembly 1. While the particular shape of the protrusion 42 in this exemplary embodiment provides a more secure fit, as described above, the invention is not specifically limited to a protrusion of a particular shape.

In the exemplary embodiments shown in the figures, a protrusion 42 is formed on the inner retention finger 40, but the assembly is not limited to this configuration. For example, protrusions may be formed on outer retention fingers instead of an inner retention finger. Alternatively, protrusions may be formed on both outer retention fingers and inner retention fingers. The protrusion may even be formed on the rib attachment with a corresponding hole being formed on one or more of the retention fingers.

The inner retention finger 40 and outer retention fingers 36 are flexible and resilient in order to secure the panel 6, as shown in FIG. 10. Particularly, as shown in FIG. 10, the panel 6 of the exemplary embodiment includes a hole 7. In order to secure the panel 6 to the fastener 30, the hole 7 is aligned with the bottom of the fastener 30 and is slid over the fastener 30. As the panel 6 is slid over the fastener 30, it pushes the retention fingers 36, 40 inwardly until the panel 6 reaches the peaks 37, 43. As the panel 6 is pushed further onto the fastener 30, the retention fingers 36, 40 begin to be released back towards their original positions.

As shown in FIG. 9, when the fastener 30 is assembled with the rib attachment 10, the support 50 fits over the rails 12 and bottom end portion of the rib attachment 10. Particularly, the legs 52 of the support fit over the rails 12 of the rib attachment and the bottom end portion 54 of the support 50 fits over a bottom end portion 15 of the rib attachment 15. Because the legs 52 of the support 50 fit over the rails 12 of the rib attachment 10, the fastener 30 is more securely attached to the rib attachment 10. If the fastener 30 of the present exemplary embodiment is subjected to a side load, the legs 52 of the fastener 30 will hit the rails 12 of the rib attachment 10, preventing the fastener 30 from being disengaged from the rib attachment 10. Thus, the legs 52 of the support 50 are particularly helpful in limiting or preventing a side load from knocking the fastener 30 off of the rib attachment 10 and rib 4. Additionally, the legs 52 can assist in properly aligning the fastener on the rib attachment 10 during assembly.

Furthermore, the support 50 may provide at least some sealing between the fastener 30 and the panel 30 by filling the hole in the panel 6. In one exemplary embodiment, at least part of the support 50 may be made of a different material than the rest of the fastener 30 in order to increase the sealing effect of the support. For example, at least part of the support 50 may be made of a rubber or foam material. When at least a portion of the support is made of a different material than other parts of the fastener 30, the fastener may be made using a two-shot process.

As discussed earlier, the fastener 30 may also include a pair of tension fingers 34 protruding from a top of the base 32. These tension fingers may take the form of elastic protrusions, as shown in the exemplary embodiment, and reduce rattling or moving of the fastener assembly. As shown in FIG. 9, when the fastener assembly is assembled, the tension fingers 34 press against the rib 4. When the tension fingers 34 press against the rib 4, they are put under a load by the rib 4 and may be elastically deformed. Thus, the fastener 30 is pressed between the rib 4 and the panel 6 so that its movement is limited and any resulting rattling or the like is also limited or prevented.

Another exemplary embodiment of the fastener assembly of the present invention is shown in FIGS. 12-17. The features of this embodiment of the invention are the same as those in the exemplary embodiment of FIGS. 1-11 unless otherwise noted or illustrated.

Figure 12:
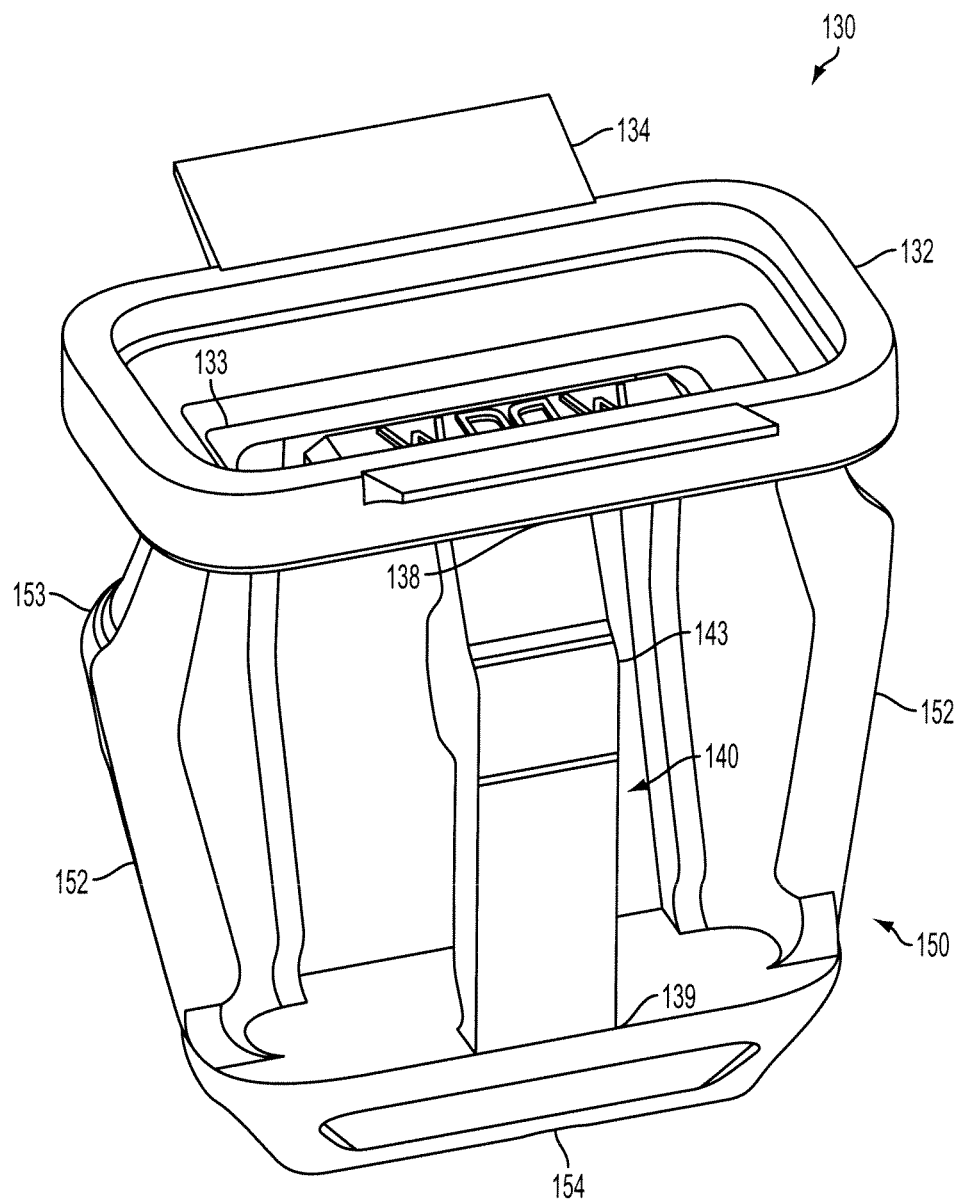
FIG. 12 is a perspective view of another exemplary embodiment of a fastener.
Figure 13:
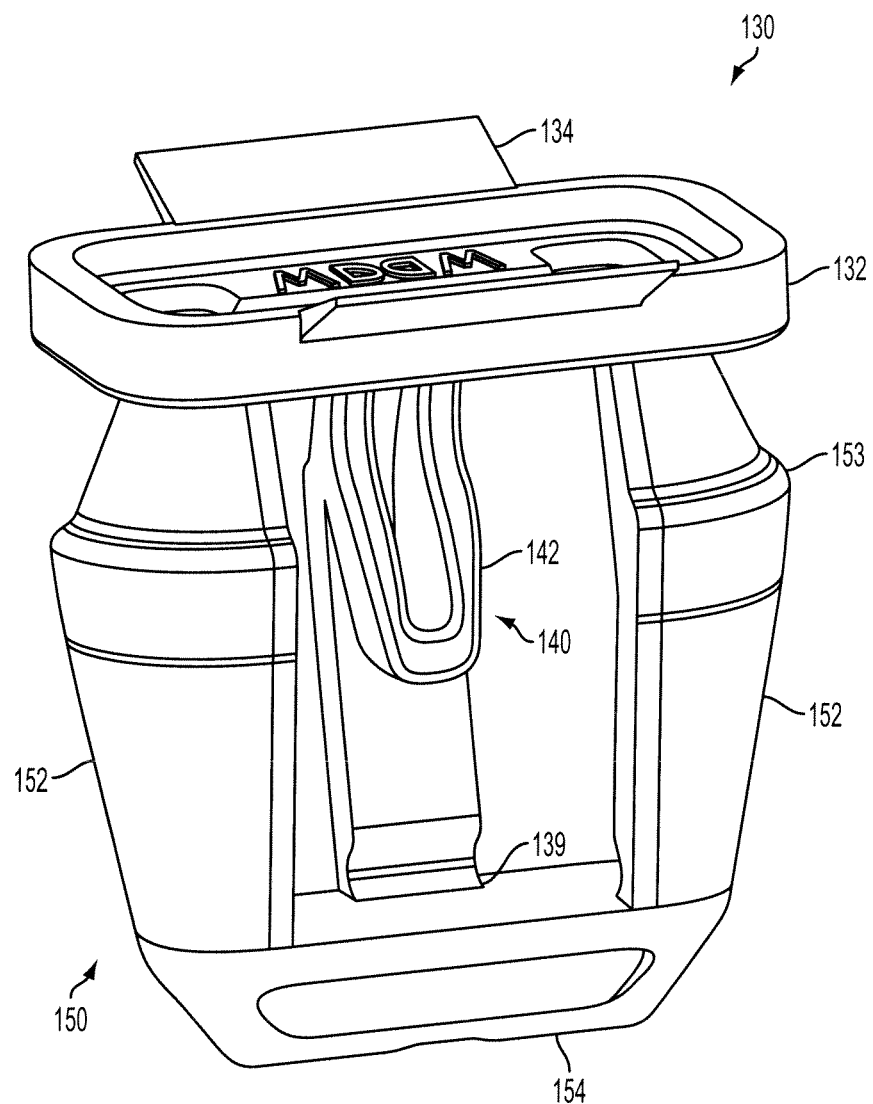
FIG. 13 is another perspective view of the fastener of FIG. 12.

FIGS. 12 and 13 are perspective views of the fastener 130. As shown in these drawings, the fastener has a base 132 with a cutout portion 133 which is similar to the base 32 of the previously described embodiment. The cutout portion 133 is designed to correspond to the shape of a rib attachment 110 to be fit to into the cutout portion 133. Particularly, the cutout portion 133 is designed in a shallow "U" shape. As with the previously described embodiment, the base can include tension fingers 134 extending from sides of the base 132. The base of this embodiment can also be made concave, as in FIG. 4. As shown in FIGS. 12 and 13, the fastener 130 includes a retention finger 140 which connects to base 132 at a first end 138 and a support 150 at a second end 139 and having a peak 143. A panel 6 (not shown) can be held between the peak 143 and the base 132. The retention finger 140 includes a protrusion 142 designed to engage a hole 120 in the attachment rib 110 described later. This protrusion is identical to the protrusion 42 shown in the embodiment of FIGS. 1-11. As shown in FIGS. 12 and 13, the fastener 132 has a support 150 with a bottom end 154 and legs 152. As best shown in FIG. 13, the legs 152 expand outwardly towards ridges 153. In this embodiment, the ridges 153 aid in holding the panel 6 on the fastener between the ridge 153 and the base 132. Because the legs 152 are able to hold a panel 6, this exemplary embodiment does not include any outer retention fingers, although outer retention fingers could be included for additional support or retention if desired.

As shown in FIG. 12, the legs 152 are generally opposed to the inner retention finger 140 with respect to a centerline of the base 132. This is different than in the exemplary embodiment of FIGS. 1-11, in which the legs 52 of the support 50 are symmetrical about a centerline running through a length of the base 32.

Figure 14:
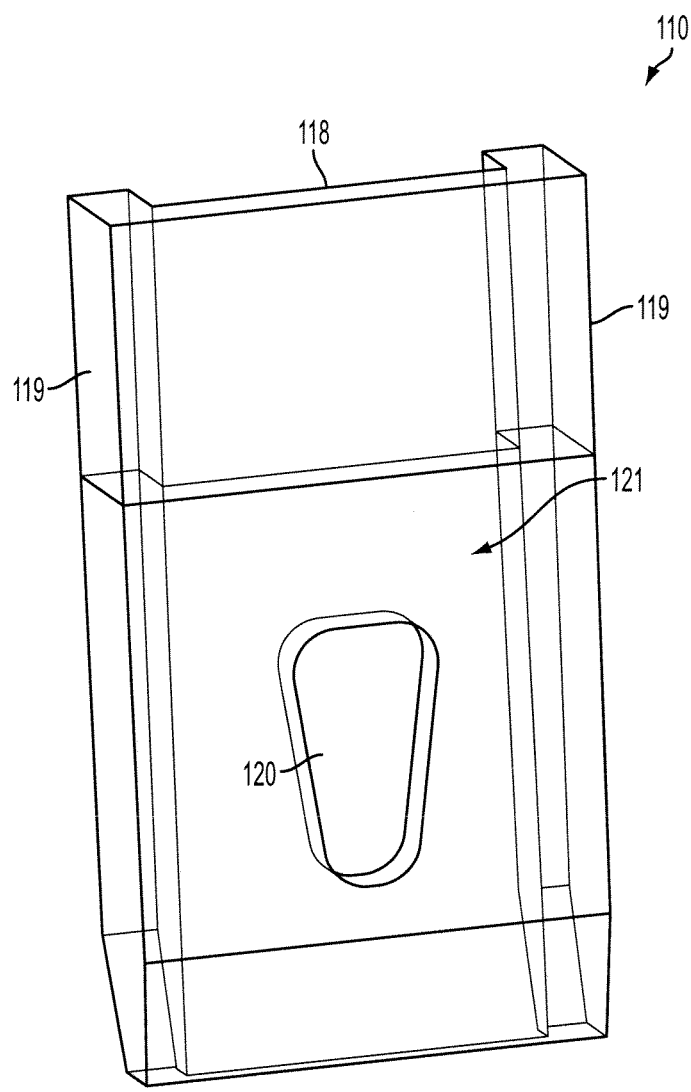
FIG. 14 is a perspective view of a front side of another exemplary embodiment of a rib attachment.
Figure 15:
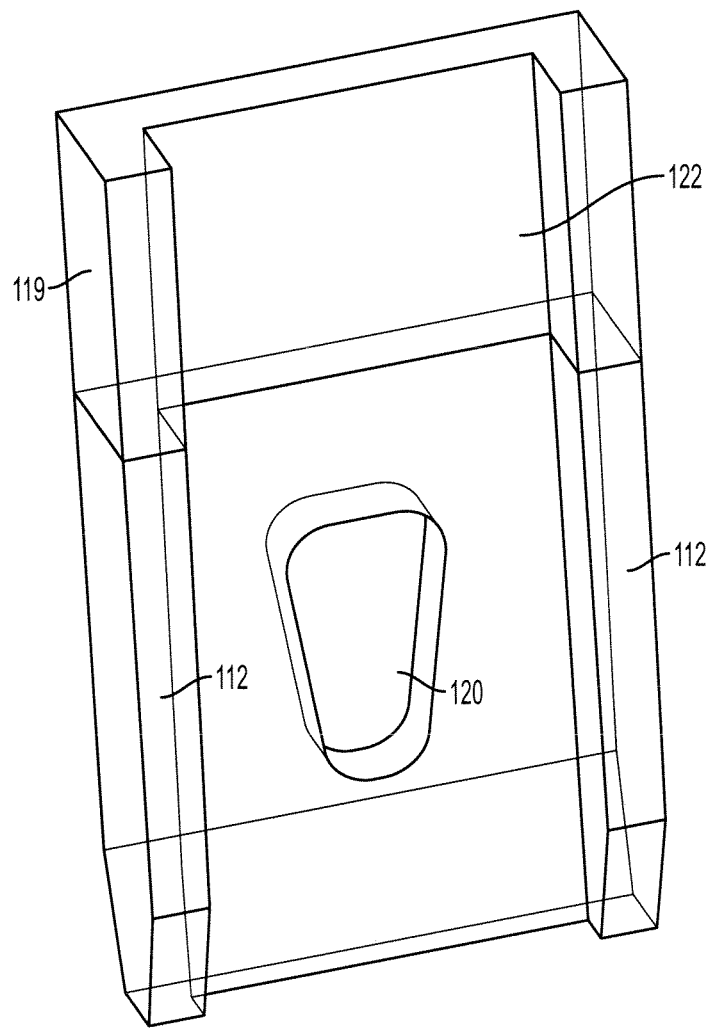
FIG. 15 is a perspective view of a back side of the rib attachment shown in FIG. 14.

A rib attachment 110 for use with the fastener 130 is shown in FIGS. 14 and 15. The rib attachment 110 has a body portion 116 and side rails 112. FIG. 14 shows a front side 121 of the rib attachment 110 and FIG. 15 shows a back side 122 of the rib attachment 110. In this embodiment, the side rails 112 extend only from one side, the back side 122, of the rib attachment 110. The rib attachment 110 also includes a hole 120 in the body 116 which decreases in width from a top to a bottom. The rib attachment 110 has side edges 119 at the sides of the side rails 112.

Figure 16:
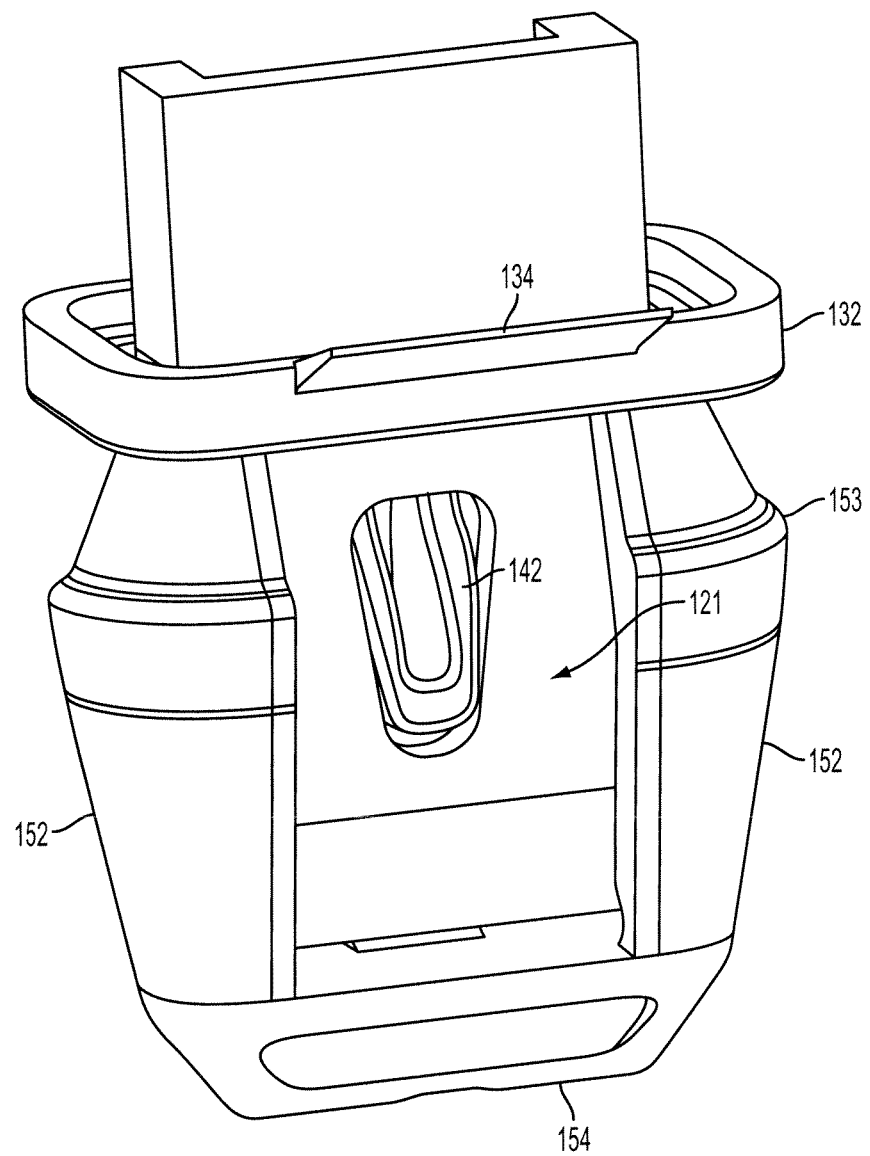
FIG. 16 is a perspective view of an assembly of the fastener of FIGS. 12 and 13 and the rib attachment of FIGS. 14 and 15.
Figure 17:
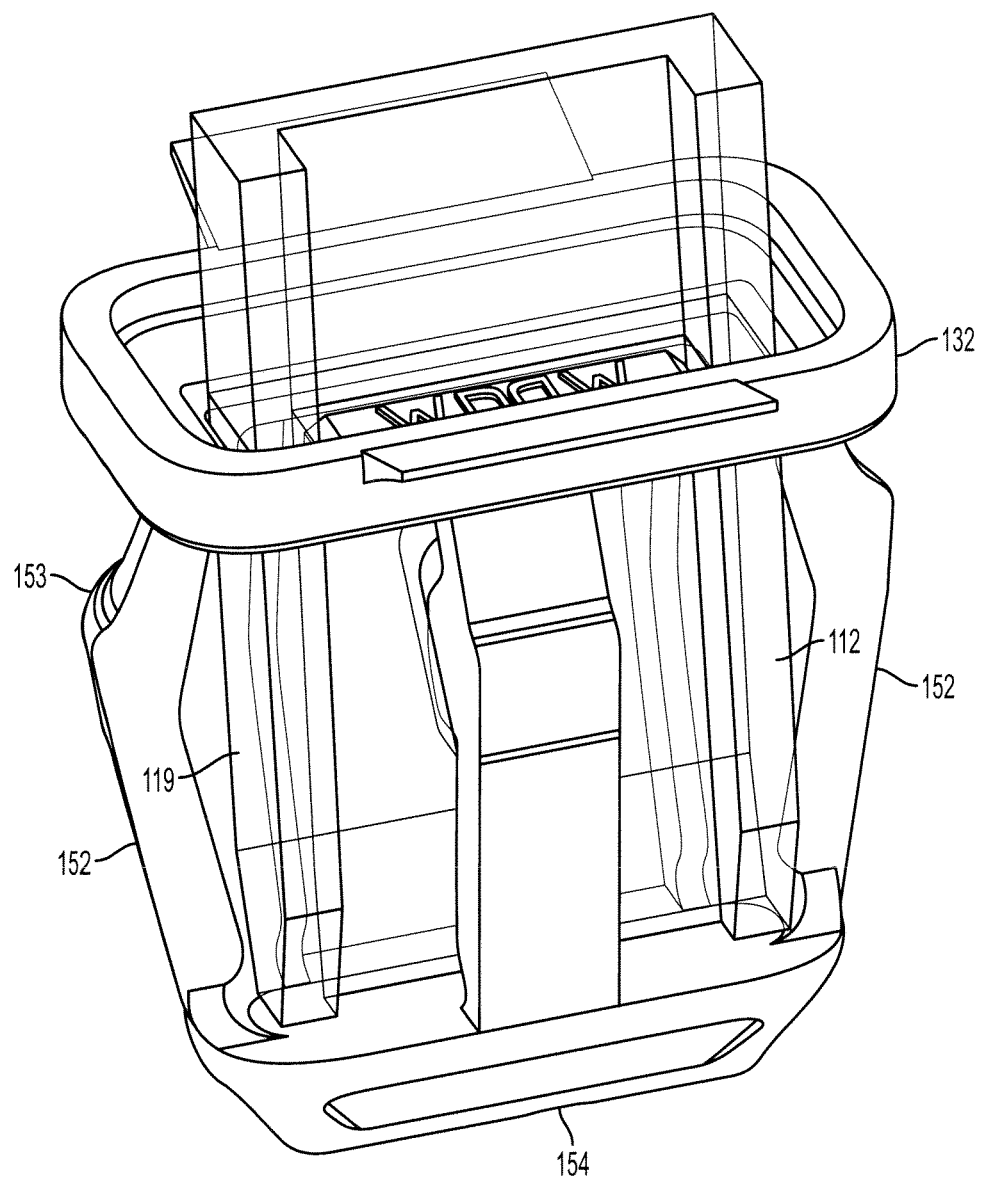
FIG. 17 is another perspective view of the assembly of FIG. 16.

The fastener assembly 101 including the rib attachment 110 and the fastener 130 is shown in FIGS. 16 and 17. As shown in these figures, the rib attachment 110 can be inserted through the cutout 133 into the fastener 130. The protrusion 142 fits into the hole 120 to secure the fastener 130 and the rib attachment 110. The support 150 may also serve to guide the rib attachment in the fastener 130 and keep it n place. The legs 152 of the support cover at least a portion of the side edges 119 of the rib attachment 110. The legs 152 also cover a portion of the front side 121 of the rib attachment The support helps to keep the fastener 130 and the rib attachment 110 attached to one another. For example, if the assembly is subjected to a side load which causes the rib attachment 110 to move sideways with respect to the fastener 130, the side edge 119 of the rib attachment 110 will hit the legs 152 of the fastener to limit the relative movement. Also, a tilting of the rib attachment 110 will cause a top end 118 of the rib attachment to strike the top portion 154 of the support. Furthermore, as mentioned above, the legs 152 in this embodiment are opposed to the retention finger 140. Thus, back and forth movement is limited by the presence of the retention finger 140 and the legs 152. Movement is also limited by the base 132 which includes a cutout 133 corresponding to the shape of the rib attachment 110. In at least these ways, the fastener and rib attachment of the present embodiment provide a stable and secure attachment between the rib attachment 110 and the fastener 130.

The protrusion 142 is shaped the same as the protrusion 42 described above with respect to the exemplary embodiment of FIGS. 1-11. So, for example, the protrusion 142 may be made long enough to extend through the hole 120 to ensure a strong engagement between the protrusion 142 and the hole 120.

The rib attachment 110 may be attached to a rib 4 (not shown) by any of various means including welding or adhesion. Additionally, the rib attachment 110 is shown in the drawing as extending substantially past the base 132. However, the rib attachment 110 may be shorter so that it only extends slightly beyond the base 132 or is substantially parallel with the base 132.

As discussed above, a panel 6 (not shown) can be secured between the peak 143 and ridges 153 at a top end and the base 132 at a bottom end.

Features of the different embodiments may be combined or substituted as practicable. For example, although this embodiment does not include outer retention fingers, such fingers could be added if desired. Also, the support 150 could be made to wrap around the entire sides of the fastener 132, as with the support 50. Similarly, the support 150 of FIGS. 12 and 13 could be used in the embodiment of FIGS. 1-11 or ridges 153 like that shown with the support 150 could be added to the support 50. Exemplary embodiments of the present invention have been described for illustrative purposes, and those skilled in the art will appreciate that various modifications, additions and substitutions are possible, without departing from the scope and spirit of the invention as disclosed in the accompanying claims.

What is claimed is:

1. A fastener comprising:
   a base having a cutout portion adapted to slidably receive a rib attachment, the cutout shaped to substantially correspond complementarily to a cross section of the rib attachment such that edges of the rib attachment mesh with the cutout portion;
   a support part extending from a bottom of the base, the support part including two legs and an end portion, the two legs extending from the base and being connected to one another by the end portion;
   a resilient first retention finger located between the legs of the support part, a first end of the first retention finger being attached to the bottom of the base and a second end of the first retention finger attached to the end portion of the support, the first retention finger extending outwardly to a peak and tapering inwardly from the peak towards the first and second ends; and
   resilient second and third retention fingers located oppositely about the first retention finger and between the legs of the support part having a first end of the second and third retention fingers being attached to the bottom of the base and a second end of the second and third retention fingers attached to the end portion of the support, the second and third retention fingers both extending outwardly to a peak oppositely directed with respect to the peak of the first retention finger.

2. The fastener according to claim 1, wherein the first retention finger is opposed to the legs of the support with respect to a centerline running along a length of the base and the second and third retention fingers are opposed to the first retention finger with respect to the centerline.

3. The fastener according to claim 1, wherein the first retention finger includes a protrusion which protrudes towards the second and third retention fingers and past a centerline running along a length of the base.

4. The fastener according to claim 3, wherein the protrusion becomes narrower in a direction away from the base, is angled such that a bottom end portion protrudes further than a top portion.

5. The fastener according to claim 1, wherein the first retention finger is flexible when pushed toward the second and third retention fingers simultaneously with the second and third retention fingers being individually flexible when pushed toward the first retention finger.

6. The fastener according to claim 1, wherein the fastener further includes:
   first and second oppositely directed elastic tension fingers protruding from a top of the base; and
   wherein the base includes a cutout.

7. The fastener according to claim 1, wherein the support part is made of a different material than the retention fingers.

8. The fastener according to claim 2, wherein the legs include ridge portions between the base end the end portion.

9. The fastener according to claim 3, wherein the protrusion is substantially hollow, having a hollow portion bounded by two side walls.

10. The fastener according to claim 5, wherein each of the first, second, and third retention fingers are inwardly and outwardly flexible and resilient with respect to the legs and a centerline of the fastener.

11. The fastener according to claim 1, wherein the second and third retention fingers are narrower where they meet the end portion of the support thereby increasing flexibility of the second and third retention fingers.

* * * * *